(12) United States Patent  
Yonezawa et al.

(10) Patent No.: US 6,889,540 B2  
(45) Date of Patent: May 10, 2005

(54) CRANK ANGLE DETECTING DEVICE FOR AN INTERNAL COMBUSTION ENGINE

(75) Inventors: Shiro Yonezawa, Tokyo (JP); Akira Furuta, Tokyo (JP); Yasuyoshi Hori, Tokyo (JP); Hideki Hagari, Tokyo (JP); Tatsuhiko Takahashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 25 days.

(21) Appl. No.: 10/434,147

(22) Filed: May 9, 2003

(65) Prior Publication Data

US 2004/0083800 A1 May 6, 2004

(30) Foreign Application Priority Data

Nov. 6, 2002 (JP) ........................................ 2002-322843

(51) Int. Cl.[7] .............................................. G01M 15/00
(52) U.S. Cl. ....................................................... 73/117.3
(58) Field of Search .............................. 73/116, 117.2, 73/117.3, 118.1

(56) References Cited

U.S. PATENT DOCUMENTS

| | | | | |
|---|---|---|---|---|
| 6,612,296 B1 | * | 9/2003 | Yonezawa et al. | ........... 123/612 |
| 6,644,273 B1 | * | 11/2003 | Hagari et al. | ........... 123/406.18 |
| 6,679,108 B2 | * | 1/2004 | Robertson et al. | ........... 73/117.3 |
| 6,732,713 B1 | * | 5/2004 | Yonezawa et al. | ........... 123/476 |
| 2003/0000293 A1 | * | 1/2003 | Robertson et al. | ........... 73/118.1 |
| 2004/0007054 A1 | * | 1/2004 | Makino et al. | ............ 73/117.3 |
| 2004/0089272 A1 | * | 5/2004 | Kanazawa et al. | .......... 123/476 |

FOREIGN PATENT DOCUMENTS

JP    11-315748 A    11/1999

* cited by examiner

*Primary Examiner*—Eric S. McCall  
(74) *Attorney, Agent, or Firm*—Sughrue Mion, PLLC

(57) ABSTRACT

The present invention has: a crank signal vane in which teeth are provided on a circumference at predetermined crank angles, and a first missing tooth portion having one missing tooth and a second missing tooth portion having two missing teeth are established; a crank angle sensor for outputting a pulse shape crank signal pattern corresponding to the teeth; and an electronic control unit for calculating a crank signal period based on the crank signal pattern, computing a missing tooth identification value based on the calculated crank signal period; detecting the number of missing teeth based on the computed missing tooth identification value, detecting a crank angle reference position for cases in which the detected number of missing teeth is one or two, and identifying a cylinder group.

11 Claims, 18 Drawing Sheets

FIG. 7

| DISTRIBUTION RANGE | | | | | | | | | | | | | | | | | | NUMBER OF MISSING TEETH |
|---|---|---|---|---|---|---|---|---|---|---|---|---|---|---|---|---|---|---|
| n-17 | n-16 | n-15 | n-14 | n-13 | n-12 | n-11 | n-10 | n-9 | n-8 | n-7 | n-6 | n-5 | n-4 | n-3 | n-2 | n-1 | n | |
| | | | | | | | | A/B | | | | | | | | | B/C/D | 1 MISSING TOOTH |
| D/E | | | | | | | | A/B | | | | | | | | | D/E | 2 MISSING TEETH |
| | B/C/D | | | | | | | | | | | | | | | | | |
| VALUES OTHER THAN THE ABOVE | | | | | | | | | | | | | | | | | | NONE |

FIG. 10

| DISTRIBUTION RANGE | | | | | | | | | | | | NUMBER OF MISSING TEETH |
|---|---|---|---|---|---|---|---|---|---|---|---|---|
| n-11 | n-10 | n-9 | n-8 | n-7 | n-6 | n-5 | n-4 | n-3 | n-2 | n-1 | n | |
| | | | | | | A/B | | | | | | 1 MISSING TOOTH |
| | | | | | | | | | | | B/C/D | |
| | B/C/D | | | | | A/B | | | | | | 2 MISSING TEETH |
| D/E | | | | | | | | | | | D/E | |
| VALUES OTHER THAN THE ABOVE | | | | | | | | | | | | NONE |

CRANK ANGLE DETECTING DEVICE FOR AN INTERNAL COMBUSTION ENGINE

BACKGROUND OF THE INVENTION

1. Field of the Invention

The present invention relates to an engine control device installed in a vehicle, and more particularly to a crank angle detecting device for an internal combustion engine.

2. Description of the Related Art

A crank angle position detecting means and a cam signal detecting means are used in order to perform engine crank angle position control and cylinder identification. The crank angle position detecting means is generally one that provides a signal every 10° CA (crank angle) in order to perform angle control with excellent accuracy. In addition, devices that perform early stage cylinder identification in order to improve startability have been proposed, and for the case of a four-cylinder engine, cylinder identification is performed at one ignition stroke interval (180° CA).

A device disclosed in Japanese Patent Laid-Open No. 11-315748, for example, is a conventional internal combustion engine crank angle detecting device.

The crank angle position detecting means in the device uses a 10° CA signal, and crank angle reference positions (missing teeth) are established in two locations, every 180° CA, in one crank revolution (360° CA period).

Further, identification signals for from one to four cylinders are established every 180° CA in two crank rotations (720° CA period) as cam signals.

Crank angle locations are detected by the above-mentioned crank angle detecting means, and cylinder identification is performed with respect to the number of cylinder identification signals in a 180° CA period of the cam signal. The number of cylinder identification signals in the 180° CA period of the cam signal is different for each of the cylinders, and therefore it becomes possible to identify the cylinders every ignition stroke interval. In addition, such a structure is capable of cylinder identification even if the cam phase changes due to a VVT (variable valve timing mechanism).

For cases in which a different number of cylinder identification signals are established for each cylinder in the cam signal of an engine with VVT, it is necessary to establish cylinder identification signals equal to the number of cylinders during a relatively small angular gap so as to achieve cylinder identification, even if the cam shaft angle changes by VVT, with a conventional device as discussed above. The gap between signals becomes small if the diameter of a cam signal vane is small, and therefore there is a problem in that the cylinder identification signal cannot be detected by the cam signal detecting means.

Further, the number of cylinder identification signals of the cam signal increases if there are additional cylinders, so that the signal gap becomes increasingly short, and there is a problem in that detection of the cylinder identification signal cannot be made by the cam signal detecting means.

SUMMARY OF THE INVENTION

The present invention has been made in order to solve the above-mentioned problems, and an object of the present invention is to obtain an crank angle detecting device for an internal combustion engine capable of simplifying information that must be established in cam signal vanes in order to perform cylinder identification by establishing a cylinder group identifying means (missing tooth) in the crank signal vane.

A crank angle detecting device for an internal combustion engine according to an aspect of the present invention includes: a crank signal vane that rotates in synchronous with a crank shaft of the internal combustion engine, and is provided with teeth on a circumference at predetermined crank angles, and with a first missing tooth portion having a first predetermined number of missing teeth and a second missing tooth portion having a second predetermined number of missing teeth. Also, the crank angle detecting device includes: a crank angle sensor that outputs a pulse shape crank signal pattern corresponding to the teeth and attached in proximity to the crank signal vane; and an electronic control unit that calculates a crank signal period based on the crank signal pattern, computes a missing teeth determination value based on the calculated crank signal period, detects the number of missing teeth based on the computed missing teeth determination value, and detects a crank angle reference position based on the detected number of missing teeth. As a result, there can be obtained such an effect that the crank angle can be computed.

A crank angle detecting device for an internal combustion engine according to another aspect of the present invention includes: a crank signal vane that rotates in synchronous with a crank shaft of the internal combustion engine, and is provided with teeth on a circumference at predetermined crank angles, and with a first missing tooth portion having a first predetermined number of missing teeth and a second missing tooth portion having a second predetermined number of missing teeth. Also the crank angle detecting device includes a crank angle sensor that outputs a pulse shape crank signal pattern corresponding to the teeth and attached in proximity to the crank signal vane; and an electronic control unit having: a determination value computing means for calculating a crank signal period based on the crank signal pattern and computes a missing teeth determination value based on the calculated crank signal period; a region determining means for determining which of the missing tooth regions that are set in advance corresponds to the missing teeth determination value; and a missing teeth number identifying means for comparing a plurality of region determination values that are obtained in a time sequence from the region determining means with a predetermined discrimination pattern, which detects a crank angle reference position based on the determined number of missing teeth. As a result, there can be obtained such an effect that the amount of leeway is increased for missing tooth detection.

A crank angle detecting device for an internal combustion engine according to another aspect of the present invention includes: a crank signal vane that rotates in synchronous with a crank shaft of the internal combustion engine, and is provided with teeth on a circumference at predetermined crank angles, in which a plurality of missing tooth portions are formed, and at least the number of teeth existing between a reference missing tooth portion and at least one adjacent missing tooth portion differs from the number of teeth existing between other missing tooth portions. Also, the crank angle detecting device includes a crank angle sensor that outputs a pulse shape crank signal pattern corresponding to the teeth and attached in proximity to the crank signal vane; and an electronic control unit that finds the number of teeth between the missing tooth portions based on the crank signal pattern, and detects a reference position of the crank angle. As a result, there can be obtained such an effect that the crank angle can be computed.

BRIEF DESCRIPTION OF THE DRAWINGS

In the accompanying drawings:

FIG. 7 is a diagram showing a missing teeth number identification map of a four-cylinder engine according to Embodiment 2 of the present invention;

FIG. 10 is a diagram showing a missing teeth number identification map of a six-cylinder engine according to Embodiment 4 of the present invention;

DETAILED DESCRIPTION OF THE PREFERRED EMBODIMENTS

Embodiment 1 explains a method of detecting the number of missing teeth with respect to the range of a missing tooth identification value K of a four-cylinder engine, and Embodiment 2 similarly explains a method of determining the number of missing teeth by using a missing teeth number identification map for a four-cylinder engine.

Further, Embodiment 3 explains a method of detecting the number of missing teeth with respect to the range of a missing tooth identification value K of a six-cylinder engine, and Embodiment 4 similarly explains a method of determining the number of missing teeth by using a missing teeth number identification map for a six-cylinder engine.

Further, Embodiment 5 explains a method of detecting the number of missing teeth with respect to the range of a missing tooth identification value K of a three-cylinder engine, and Embodiment 6 similarly explains a method of determining the number of missing teeth by using a missing teeth number identification map for a three-cylinder engine.

In addition, Embodiment 7 explains a method of detecting the number of missing teeth with respect to the range of the missing tooth identification value K of a four-cylinder engine for cases in which missing teeth are set in two locations in each ignition stroke interval, and Embodiment 8 explains a method of detecting the number of missing teeth with respect to the range of the missing tooth identification value K of a six-cylinder engine and a three-cylinder engine for cases in which missing teeth are set in two locations in each ignition stroke interval.

Embodiment 1

Figure 1:
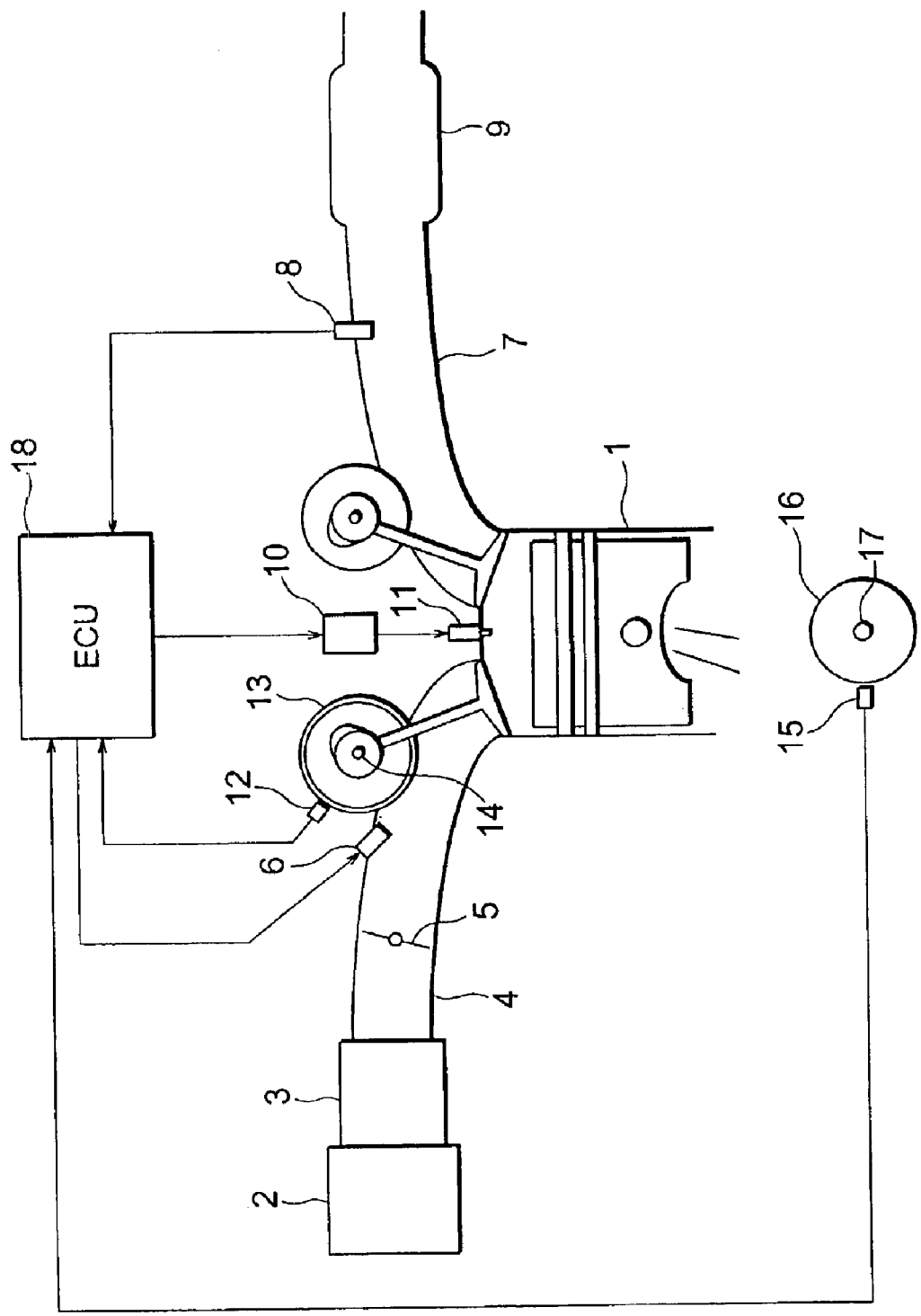
FIG. 1 is a diagram showing the structure of a crank angle detecting device for an internal combustion engine according to Embodiment 1 of the present invention.

A crank angle detecting device for an internal combustion engine according to Embodiment 1 of the present invention is explained while referring to the diagrams. FIG. 1 is a diagram showing the schematic structure of the internal combustion engine according to Embodiment 1 of the present invention. Note that, within each of the figures, identical reference numerals denote identical or corresponding portions.

In FIG. 1, reference numeral 1 denotes an internal combustion engine, reference numeral 2 denotes an air cleaner, reference numeral 3 denotes an air flow sensor, reference numeral 4 denotes an intake pipe, reference numeral 5 denotes a throttle valve, reference numeral 6 denotes an injector, reference numeral 7 denotes an exhaust pipe, and reference numeral 8 denotes an oxygen ($O_2$) sensor. Reference numeral 9 denotes a catalyst, reference numeral 10 denotes an ignition coil, reference numeral 11 denotes a spark plug, reference numeral 12 denotes a cam signal sensor, and reference numeral 13 denotes a cam signal vane. Reference numeral 14 denotes a cam shaft, reference numeral 15 denotes a crank angle sensor, reference numeral 16 denotes a crank signal vane, reference numeral 17 denotes a crank shaft, and reference numeral 18 denotes an electronic control unit (ECU). Note that FIG. 1 can also be considered for the explanations of four-cylinder, six-cylinder, and three-cylinder engines in each of the following embodiments.

Figure 2:
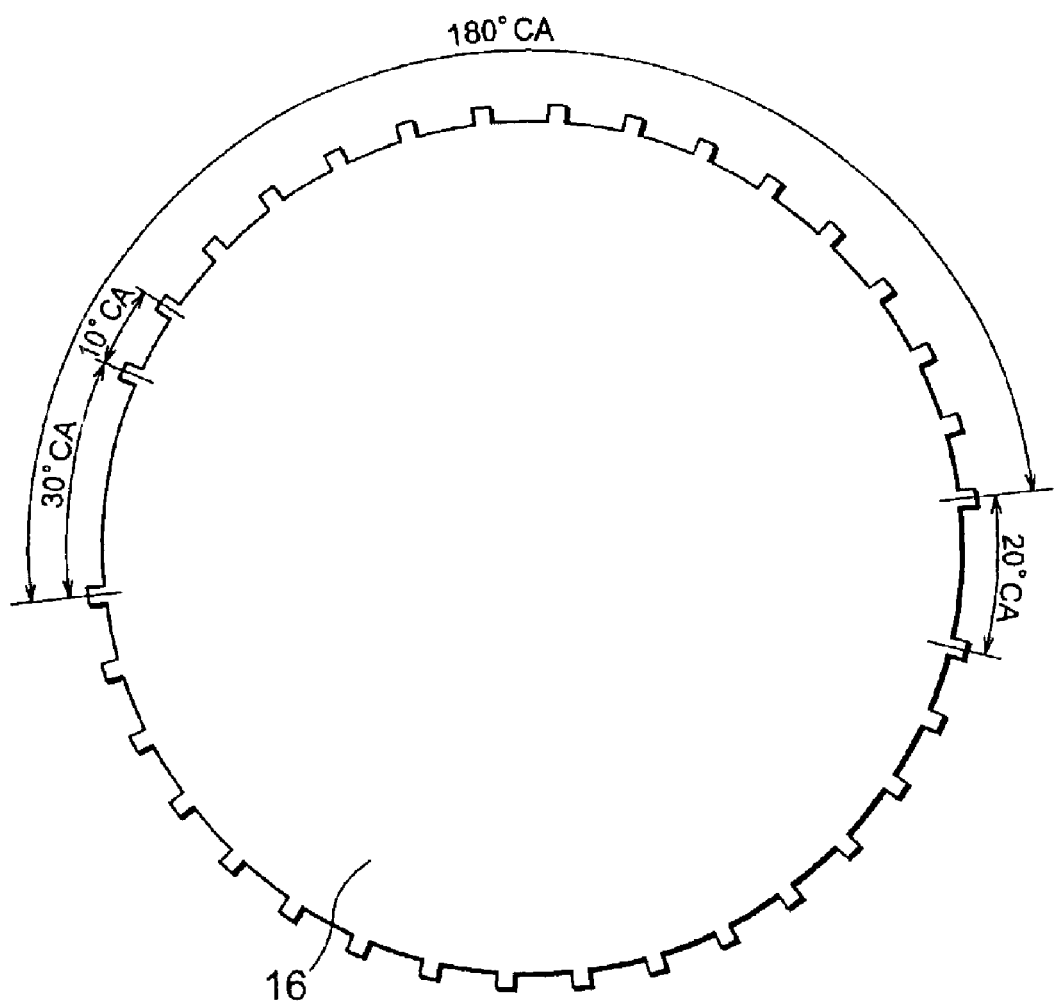
FIG. 2 is a diagram showing a crank signal vane of a four-cylinder engine according to Embodiment 1 of the present invention.

FIG. 2 is a diagram showing a crank signal vane of a four-cylinder engine according to Embodiment 1 of the present invention.

Teeth (protrusions) are formed in the crank signal vane 16 at every 10° CA in 360° of CA. Further, a 20° CA missing teeth portion (one missing tooth), and a 30° missing teeth portion (two missing teeth) are formed each 180° of CA.

Actions of the crank angle detecting device for the internal combustion engine according to Embodiment 1 are explained next while referring to the diagrams.

Figure 3:
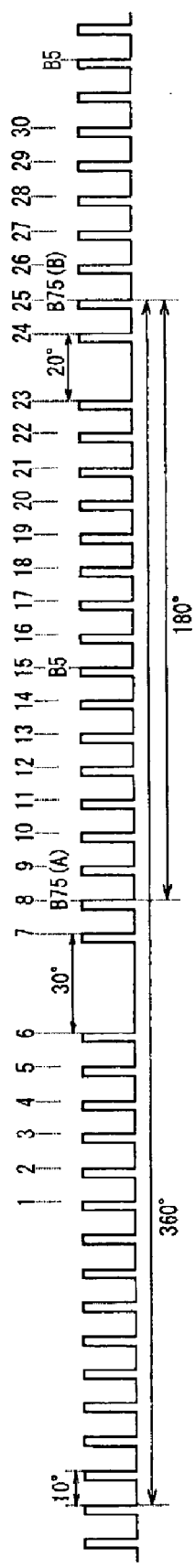
FIG. 3 is a diagram showing a crank signal pattern of the four-cylinder engine according to Embodiment 1 of the present invention.

FIG. 3 is a diagram showing a crank signal pattern of the four-cylinder engine according to Embodiment 1 of the present invention.

The crank signal pattern shown in FIG. 3 is detected by the crank angle sensor 15, and is input to the electronic control unit 18. The crank signal pattern is a signal output waveform of the crank angle sensor 15 with respect to the teeth of the crank signal vane 16 shown in FIG. 2.

The electronic control unit 18 is set so as to detect the trailing edge timing of the crank signal, and perform computation processing for each training edge.

The electronic control unit 18 performs computation of the missing tooth identification value K described below for each crank signal detection, and detection of the number of missing teeth is performed with respect to the range of the missing tooth identification value K.

$$K=(Tn-1)^2/\{(Tn-2)*Tn\}$$

Tn expresses the current crank signal period, Tn−1 expresses the previous crank signal period, and Tn−2 expresses the crank signal period before the previous crank signal period.

If K<2.25, then no missing teeth are detected. Further, if 2.25≦K<6.25, then one missing tooth is detected. In addition, if K≧6.25, then two missing teeth are detected.

A method of missing teeth detection is explained according to FIG. 3. Note that the term crank signal period as used here simply denotes the ratio of angular gaps.

If the crank signal detected this time is equal to 1 to 6, then Tn−2=1, Tn−1=1, and Tn=1, and therefore K=$1^2$÷(1× 1)=1. This corresponds to a case in which K<2.25, and therefore no missing teeth are detected.

If the crank signal detected this time is equal to 7, then Tn−2=1, Tn−1=1, and Tn=3, and therefore K=$1^2$÷(1×3)=0.33. This corresponds to a case in which K<2.25, and therefore no missing teeth are detected.

If the crank signal detected this time is equal to 8, then Tn−2=1, Tn−1=3, and Tn=1, and therefore K=$3^2$÷(1×1)=9. This corresponds to a case in which K≧6.25, and therefore two missing teeth are detected.

Two missing teeth detection is performed with a crank signal being in the position of 8, and therefore the angular position is detected as B75° CA (75° CA before top dead center) and the cylinder group is detected as A.

Similarly, if the crank signal detected this time is equal to 25, then Tn−2=1, Tn−1=2, and Tn=1, and therefore K=$2^2$÷(1×1)=4. This corresponds to a case in which 2.25≦K<6.25, and therefore one missing tooth is detected.

One missing tooth detection is performed with a crank signal of 25, and therefore the angular position is detected as B75° CA and the cylinder group is detected as B.

Figure 4:
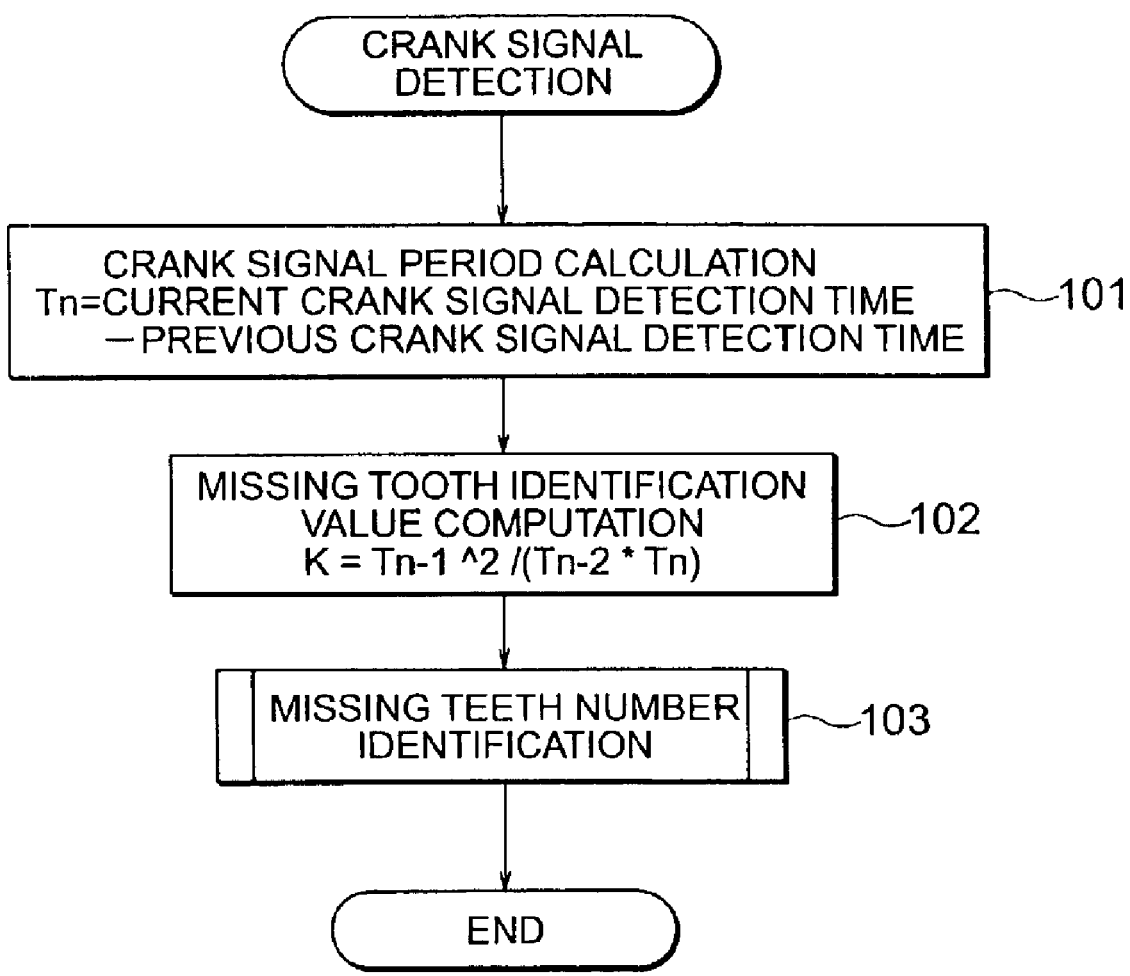
FIG. 4 is a flowchart showing action of a crank angle detecting device for the internal combustion engine according to Embodiment 1 of the present invention.

FIG. 4 is a flowchart showing action of the crank angle detecting device for the internal combustion engine according to Embodiment 1 of the present invention.

First, the electronic control unit 18 calculates a crank signal period in a step 101.

That is, the crank signal period Tn of this time is calculated as follows.

*Tn*=(current crank signal detection time)−(previous crank signal detection time)

The missing tooth identification value is computed next from the crank signal period in a stop 102.

That is, the missing tooth identification value K is computed as follows.

*K*=(previous crank signal period)$^2$/{(crank signal period before previous crank signal period)*(current crank signal period)}

Identification of the number of missing teeth is performed next in a step 103. If the missing tooth identification value K<2.25, it is determined that there are no missing teeth. Further, if 2.25≦K<6.25, then one missing tooth is detected. In addition, if K≧6.25, then two missing teeth are detected.

For cases in which missing teeth are thus identified, the crank angle reference position (B75° CA) is found, and cylinder group identification can be performed with respect to the number of missing teeth detected.

In Embodiment 1, the crank angle and the cylinder groups A and B can be identified with respect to the crank signal. That is, in a four-cylinder engine, cylinder identification can be performed by providing two types of information (cylinder identification signals) to the cam signal vane, and therefore the cam signal vane information can be simplified.

Embodiment 2

A crank angle detecting device for an internal combustion engine according to Embodiment 2 of the present invention is explained while referring to the diagrams. The structure of the crank angle detecting device for the internal combustion engine according to Embodiment 2 of the present invention is similar to that of Embodiment 1 above.

The electronic control unit 18 performs computation of the identification expressions described below for each crank signal detection, and detection of the number of missing teeth is performed with respect to the range of the identification value.

$$K1=(Tn-1)/(Tn-2)$$

$$K2=(Tn-1)/Tn$$

$$K=(K1+K2)/2$$

Tn expresses the current crank signal period, Tn−1 expresses the previous crank signal period, and Tn−2 expresses the crank signal period before the previous crank signal period.

A method of missing teeth detection is explained according to FIG. 3. Note that the term crank signal period as used here simply denotes the ratio of angular gaps.

Figure 6:
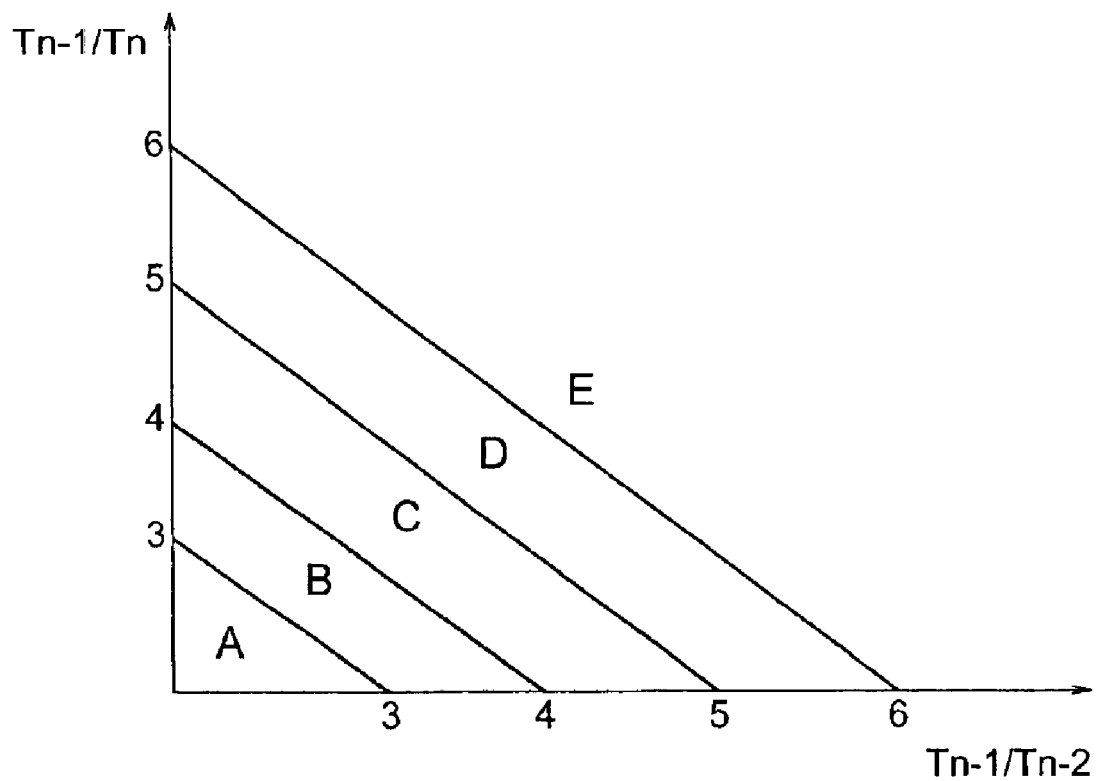
FIG. 6 is a diagram showing a missing tooth region during missing teeth number identification by a crank angle detecting device for the internal combustion engine according to Embodiment 2 of the present invention.

FIG. 6 is a diagram showing a missing tooth region during identification of the number of missing teeth on a four-cylinder engine. Further, FIG. 7 is a diagram showing a number of missing teeth map for the four-cylinder engine.

In FIG. 7, reference symbols "D/E", "A/B", "B/C/D" denotes three types of region reference values, and in addition, the two region reference values "A/B" and "B/C/D" show a duplication of a "B" region. The amount of detection leeway, in particular, is increased by using this type of structure, and even with sudden angular speed variations of the engine and the like, the reliability of missing tooth identification is increased considerably. Note that FIG. 10 is also similar.

Further, a "1 missing tooth" pattern and a "two missing teeth" pattern in FIG. 7 are used for elements that identify differences in the number of teeth existing between missing tooth, that is "n-1 to n-16=16 teeth", and "n-1 to n-15=15 teeth". The accuracy and reliability of missing tooth identification can be increased considerably by using this type of structure. Note that FIG. 10 is also similar.

The correspondence between the missing tooth identification value K and missing tooth regions A, B, C, D, and E is as follows. The missing tooth region is A if K<1.5. Further, if 1.5≦K<2, then the missing tooth region is B. Further, if 2≦K<2.5, then the missing tooth region is C, and if 2.5≦K<3, then the missing tooth region is D. In addition, the missing tooth region is E if K≧3.

If the crank signal detected this time is equal to 1 to 6, then Tn−2=1, Tn−1=1, and Tn=1, and therefore K1=1/1=1, K2=1/1=1, and K=(1+1)/2=1. This corresponds to a case in which K<1.5, and therefore the missing tooth region A is detected.

If the crank signal detected this time is equal to 7, then Tn−2=1, Tn−1=1, and Tn=3, and therefore K1=1/1=1, K2=1/3=0.33, and K=(1+0.33)/2=0.67. This corresponds to a case in which K<1.5, and therefore the missing tooth region A is detected.

If the crank signal detected this time is equal to 8, then Tn−2=1, Tn−1=3, and Tn=1, and therefore K1=3/1=3, K2=3/1=3, and K=(3+3)/2=3. This corresponds to a case in which K≧3, and therefore the missing tooth region E is detected.

In Embodiment 1 above, detection of two missing teeth is made when the crank signal is in the position of 8, but in Embodiment 2, missing tooth detection is implemented using the missing teeth number identification map (discrimination pattern) of FIG. 7 for cases in which the distribution region of the missing tooth region detected (region identification value) coincides with the missing teeth number identification map. If the missing tooth region identified this time is taken as n, then it is distributed at this point in the missing tooth region A when the crank signal is from n-7 to n-1, and is distributed in the missing tooth region E when the crank signal is equal to n. However, identification is not performed for regions having a number that satisfies the map, and therefore missing tooth detection is not implemented.

Similarly, if the crank signal detected this time is equal to 9, then Tn−2=3, Tn−1=1, and Tn=1, and therefore K1=1/3=0.33, K2=1/1=1, and K=(0.33+1)/2=0.67. This corresponds to a case in which K<1.5, and therefore the missing tooth region A is detected.

If the crank signal detected this time is equal to 10 to 23, then Tn−2=1, Tn−1=1, and Tn=1, and therefore K1=1/1=1, K2=1/1=1, and K=(1+1)/2=1. This corresponds to a case in which K<1.5, and therefore the missing tooth region A is detected.

If the crank signal detected this time is equal to 24, then Tn−2=1, Tn−1=1, and Tn=2, and therefore K1=1/1=1, K2=1/2=0.5, and K=(1+0.5)/2=0.75. This corresponds to a case in which K<1.5, and therefore the missing tooth region A is detected.

With crank signal positions from 16 to 24, the number of the previously identified missing tooth region is equal to or greater than 16, and therefore identification of the region of the number satisfying the map is performed. However, all the regions are the missing tooth region A, and therefore the distribution range of the missing tooth region (region identification value) coincides with the third missing teeth number identification map (discrimination pattern), and the number of missing teeth is identified as "none".

If the crank signal detected this time is equal to 25, then Tn−2=1, Tn−1=2, and Tn=1, and therefore K1=2/1=2, K2=2/1=2, and K=(2+2)/2=2. This corresponds to a case in which 2≦K<2.5, and therefore the missing tooth region C is detected.

If the crank signal is n-17 here, it is distributed in the missing tooth region E, and if the crank signal is from n-16 to n-1, it is distributed in the missing tooth region A. The distribution range of the missing tooth region (region identification value) therefore coincides with the first missing teeth number identification map (discrimination pattern), and the number of missing teeth is identified as "1".

One missing tooth detection is performed with a crank signal of 25, and therefore the angular position is detected as B75° CA and the cylinder group is detected as B.

Two missing teeth detection is not performed with the initial crank signal of 8, but with the next crank signal of 8, identification of the region of the number that satisfies the above-mentioned map is performed. If the crank signal is n-16, it is distributed in the missing tooth region C, and if the crank signal is from n-15 to n-1, it is distributed in the missing tooth region A. When the crank signal is n, it is distributed in the missing tooth region E. The distribution range of the missing tooth region (region identification value) therefore coincides with the second missing teeth number identification map (discrimination pattern), and the number of missing teeth is identified as "2".

Two missing teeth detection is performed with the next crank signal of 8, and therefore the angular position is detected as B75° CA and the cylinder group is detected as A.

In order to detect zero missing teeth, one missing tooth, and two missing teeth in Embodiment 1 above, threshold values are respectively set for classification, and detection of the number of missing teeth is performed. It is possible to set each of the classification threshold values for cases in which there is little variation in the crank signal period, but if there are large variations in the crank signal period, such as during startup, it is difficult to set the respective classification threshold values, and cases of erroneous detection of the number of missing teeth occur.

The number of missing teeth is not simply classified by threshold values in Embodiment 2, but rather, a plurality of missing teeth regions corresponding to each missing tooth are set, and the number of missing teeth is detected with respect to the distribution range of the missing tooth region (region identification value), and therefore breadth of each missing tooth threshold value becomes larger, and missing tooth detection can be performed with good accuracy even for cases in which variations in the crank signal period are large.

Figure 5:
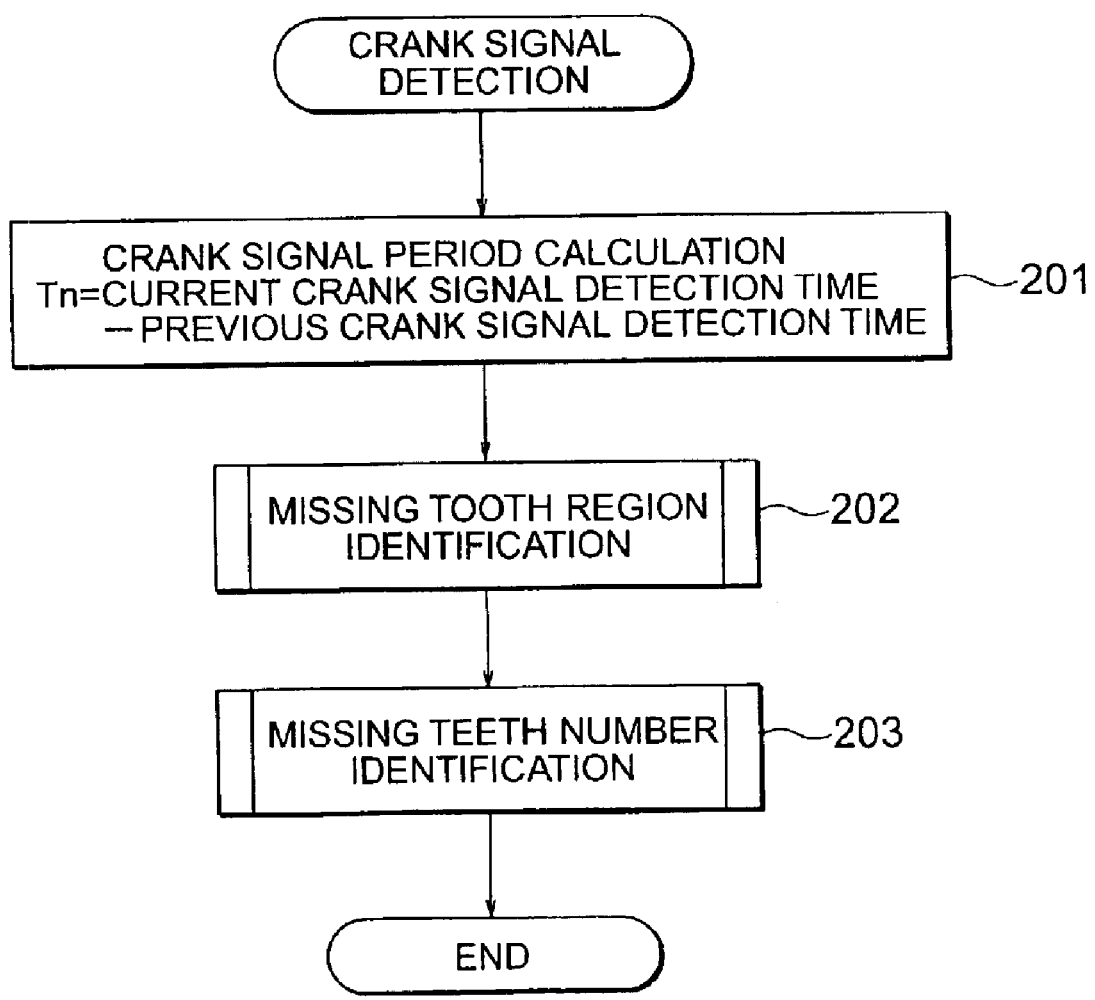
FIG. 5 is a flowchart showing action of a crank angle detecting device for an internal combustion engine according to Embodiment 2 of the present invention.

FIG. 5 is a flow chart showing action of the crank angle detecting device for the internal combustion engine according to Embodiment 2 of the present invention.

A method of performing identification of the missing teeth number with respect to the missing tooth identification value K is explained in Embodiment 1 above, but the number of missing teeth is detected in Embodiment 2 by a method like that discussed above in order to increase the amount of leeway for detecting the number of missing teeth. This computation processing method of Embodiment 2 is explained based on FIG. 5.

First, the electronic control unit 18 calculates a crank signal period in a step 201.

That is, the crank signal period Tn of this time is calculated as follows.

$$Tn = \text{(current crank signal detection time)} - \text{(previous crank signal detection time)}$$

Next, a missing tooth region is identified in a step 202 for each of the crank signal periods detected. Crank signal period ratios (Tn−1)/(Tn−2) and (Tn−1)/Tn are found first, and identification of the missing teeth regions A to E is performed when a horizontal axis shown in FIG. 6 is (previous crank signal period)/(crank signal period before previous crank signal period) and a vertical axis shown in FIG. 6 is (previous crank signal period)/(current crank signal period).

Identification of the number of missing teeth is performed next in a step 203 based on the missing tooth region. For cases in which a time sequence (region identification values) of missing tooth regions identified above coincides with a missing teeth number identification map (discrimination pattern) describing a time sequence of a missing tooth region corresponding to the number of missing teeth based on FIG. 7, the number of missing teeth is identified.

For example, refer to FIG. 3. For cases in which the crank signal period ratios corresponding to 18 successive crank signals (n-17 to n) are distributed in successive corresponding missing tooth regions, the electronic control unit 18 identifies the corresponding number of missing teeth.

That is, for cases in which the above crank signal period ratio is distributed in the missing tooth region B, C, or D shown in FIG. 6 when the currently detected crank signal is n, the crank signal period ratio is distributed in the missing tooth region A or B when the crank signal is from n-1 to n-16, and the crank signal period ratio is distributed in the missing tooth region D or E when the crank signal is n-17, the electronic control unit 18 identifies one missing tooth.

Each of the permitted regions of existence for the missing teeth becomes larger when identifying the number of missing teeth as in Embodiment 2, compared to classifying the number of missing teeth by threshold values as in Embodiment 1, and therefore the degree of leeway for detection increases.

The numbers of missing teeth are one and two in Embodiment 2, but the numbers of missing teeth are not limited to those. For example, the numbers of missing teeth may also be two and three. In this case the difference with respect to no missing teeth becomes very clear, and therefore the influence of periodic variations due to engine rotation variations becomes small, and missing tooth identification becomes easy.

Embodiment 3

A crank angle detecting device for an internal combustion engine according to Embodiment 3 of the present invention is explained while referring to the diagrams.

Figure 8:
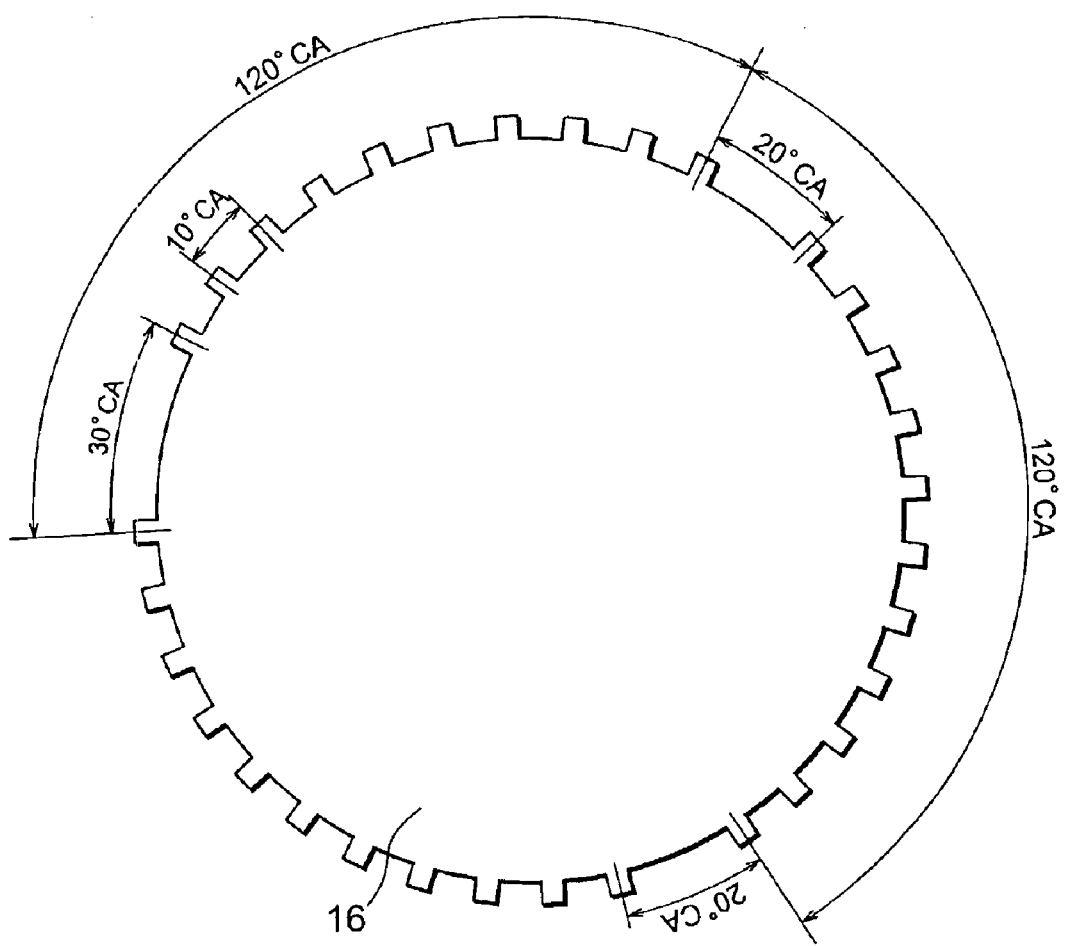
FIG. 8 is a diagram showing a crank signal vane of a six-cylinder engine according to Embodiment 3 of the present invention.

FIG. 8 is a diagram showing a crank signal vane of a six-cylinder engine according to Embodiment 3 of the present invention.

Teeth (protrusions) are formed in the crank signal vane 16 at every 10° CA in 360° of CA. Further, two 20° CA missing teeth portions (one missing tooth), and one 30° CA missing teeth portion (two missing teeth) are formed each 120° of CA.

Actions of the crank angle detecting device for the internal combustion engine according to Embodiment 3 are explained next while referring to the diagrams.

Figure 9:
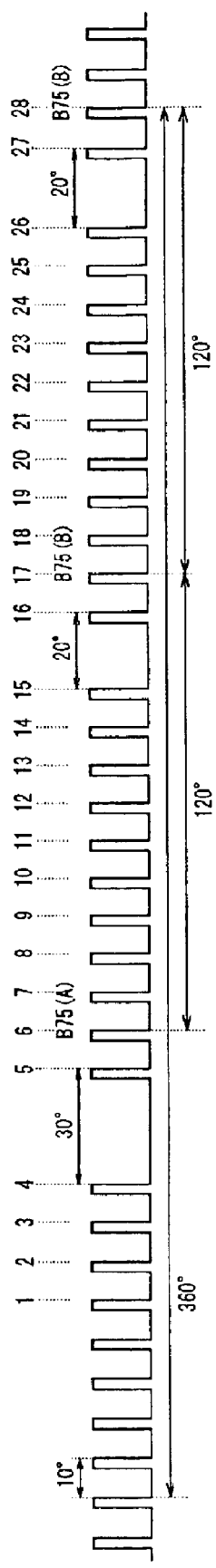
FIG. 9 is a diagram showing a crank signal pattern of the six-cylinder engine according to Embodiment 3 of the present invention.

FIG. 9 is a diagram showing a crank signal pattern of the six-cylinder engine according to Embodiment 3 of the present invention.

The crank signal pattern shown in FIG. 9 is detected by the crank angle sensor 15, and is input to the electronic control unit 18. The crank signal pattern is a signal output waveform of the crank angle sensor 15 with respect to the teeth of the crank signal vane 16 shown in FIG. 8.

The electronic control unit 18 is set so as to detect the trailing edge timing of the crank signal, and perform computation processing for each training edge.

The electronic control unit 18 performs computation of the missing tooth identification value K described below for each crank signal detection similarly to Embodiment 1 above, and detection of the number of missing teeth is performed with respect to the range of the missing tooth identification value K.

$$K=(Tn-1)^2/\{(Tn-2)*Tn\}$$

Tn expresses the current crank signal period, Tn-1 expresses the previous crank signal period, and Tn-2 expresses the crank signal period before the previous crank signal period.

If K<2.25, then no missing teeth are detected. Further, if 2.25≦K<6.25, then one missing tooth is detected. In addition, if K≧6.25, then two missing teeth are detected.

A method of missing teeth detection is explained according to FIG. 9. Note that the term crank signal period as used here simply denotes the ratio of angular gaps.

If the crank signal detected this time is equal to 1 to 4, then Tn-2=1, Tn-1=1, and Tn=1, and therefore K=1²÷(1× 1)=1. This corresponds to a case in which K<2.25, and therefore no missing teeth are detected.

If the crank signal detected this time is equal to 5, then Tn-2=1, Tn-1=1, and Tn=3, and therefore K=1²÷(1×3)= 0.33. This corresponds to a case in which K<2.25, and therefore no missing teeth are detected.

If the crank signal detected this time is equal to 6, then Tn-2=1, Tn-1=3, and Tn=1, and therefore K=3²÷(1×1)=9. This corresponds to a case in which K≧6.25, and therefore two missing teeth are detected.

Two missing teeth detection is performed with a crank signal of 6, and therefore the angular position is detected as B75° CA (75° CA before top dead center) and the cylinder group is detected as A.

Similarly, if the crank signal detected this time is equal to 17, then Tn-2=1, Tn-1=2, and Tn=1, and therefore K=2²÷ (1×1)=4. This corresponds to a case in which 2.25≦K<6.25, and therefore one missing tooth is detected.

One missing tooth detection is performed with a crank signal of 17, and therefore the angular position is detected as B75° CA and the cylinder group is detected as B.

Similarly, if the crank signal detected this time is equal to 28, then Tn-2=1, Tn-1=2, and Tn=1, and therefore K=2²÷ (1×1)=4. This corresponds to a case in which 2.25≦K<6.25, and therefore one missing tooth is detected.

One missing tooth detection is performed with a crank signal of 28, and therefore the angular position is detected as B75° CA and the cylinder group is detected as B.

The angular gaps for the missing teeth include two locations of 20° CA, and one location of 30° CA, with the crank signal vane 16 shown in FIG. 8, and therefore the identified crank angle reference positions become one at B75° CA (A) and two at B75° CA (B).

In Embodiment 3, the crank angle and the cylinder groups A and B can be identified with respect to the crank signal. That is, in a six-cylinder engine, cylinder identification can be performed by providing four types of information (cylinder identification signals) to the cam signal vane, and therefore the cam signal vane information can be simplified.

Embodiment 4

A crank angle detecting device for an internal combustion engine according to Embodiment 4 of the present invention is explained while referring to the diagrams.

Embodiment 4 utilizes the missing teeth region and the missing teeth number identification map of Embodiment 2 above to identify the number of missing teeth.

FIG. 10 is a diagram showing a missing teeth number identification map of a six-cylinder engine. The number of missing teeth for cases in which a series of missing tooth regions of a time sequence (region identification values) matches the missing tooth identification map (discrimination pattern) is identified based on FIG. 10, similar to Embodiment 2 above.

The electronic control unit 18 performs computation of the identification expressions described below for each crank signal detection, and detection of the number of missing teeth is performed with respect to the range of the identification value.

$$K1=(Tn-1)/(Tn-2)$$

$$K2=(Tn-1)/Tn$$

$$K=(K1+K2)/2$$

Tn expresses the current crank signal period, Tn−1 expresses the previous crank signal period, and Tn−2 expresses the crank signal period before the previous crank signal period.

A method of missing teeth detection is explained according to FIG. 9. Note that the term crank signal period as used here simply denotes the ratio of angular gaps.

The correspondence between the missing tooth identification value K and missing tooth regions A, B, C, D, and E is as follows. The missing tooth region is A if K<1.5. Further, if 1.5≦K<2, then the missing tooth region is B. Further, if 2≦K<2.5, then the missing tooth region is C, and if 2.5≦K<3, then the missing tooth region is D. In addition, the missing tooth region is E if K≧3.

If the crank signal detected this time is equal to 1 to 4, then Tn−2=1, Tn−1=1, and Tn=1, and therefore K1=1/1=1, K2=1/1=1, and K=(1+1)/2=1. This corresponds to a case in which K<1.5, and therefore the missing tooth region A is detected.

If the crank signal detected this time is equal to 5, then Tn−2=1, Tn−1=1, and Tn=3, and therefore K1=1/1=1, K2=1/3=0.33, and K=(1+0.33)/2=0.67. This corresponds to a case in which K<1.5, and therefore the missing tooth region A is detected.

If the crank signal detected this time is equal to 6, then Tn−2=1, Tn−1=3, and Tn=1, and therefore K1=3/1=3, K2=3/1=3, and K=(3+3)/2=3. This corresponds to a case in which K≧3, and therefore the missing tooth region E is detected.

In Embodiment 3 above, detection of two missing teeth is made when the crank signal is in the position of 6, but in Embodiment 4, missing tooth detection is implemented using the missing teeth number identification map (discrimination pattern) of FIG. 10 for cases in which the distribution region of the missing tooth region detected (region identification value) coincides with the missing teeth number identification map. If the missing tooth region identified this time is taken as n, then it is distributed at this point in the missing tooth region A when the crank signal is from n−7 to n−1, and is distributed in the missing tooth region E when the crank signal is equal to n. However, identification is not performed for regions having a number that satisfies the map, and therefore missing tooth detection is not implemented.

Similarly, if the crank signal detected this time is equal to 7, then Tn−2=3, Tn−1=1, and Tn=1, and therefore K1=1/3= 0.33, K2=1/1=1, and K=(0.33+1)/2=0.67. This corresponds to a case in which K<1.5, and therefore the missing tooth region A is detected.

If the crank signal detected this time is equal to 8 to 15, then Tn−2=1, Tn−1=1, and Tn=1, and therefore K1=1/1=1, K2=1/1=1, and K=(1+1)/2=1. This corresponds to a case in which K<1.5, and therefore the missing tooth region A is detected.

If the crank signal detected this time is equal to 16, then Tn−2=1, Tn−1=1, and Tn=2, and therefore K1=1/1=1, K2=1/2=0.5, and K=(1+0.5)/2=0.75. This corresponds to a case in which K<1.5, and therefore the missing tooth region A is detected.

With crank signal positions from 10 to 16, the previously identified missing tooth region is equal to or greater than 10, and therefore identification of the region of the number satisfying the map is performed. However, all the regions are the missing tooth region A, and therefore the distribution range of the missing tooth region (region identification value) coincides with the third missing teeth number identification map (discrimination pattern), and the number of missing teeth is identified as "none".

If the crank signal detected this time is equal to 17, then Tn−2=1, Tn−1=2, and Tn=1, and therefore K1=2/1=2, K2=2/1=2, and K=(2+2)/2=2. This corresponds to a case in which 2≦K<2.5, and therefore the missing tooth region C is detected.

If the crank signal is n-11 here, it is distributed in the missing tooth region E, if the crank signal is from n-10 to n-1, it is distributed in the missing tooth region A, and if the crank signal is n, it is distributed in the missing tooth region C. The distribution range of the missing tooth region (region identification value) therefore coincides with the first missing teeth number identification map (discrimination pattern), and the number of missing teeth is identified as "1".

One missing tooth detection is performed with a crank signal of 17, and therefore the angular position is detected as B75° CA and the cylinder group is detected as B.

Similarly, if the crank signal detected this time is equal to 28, then Tn−2=1, Tn−1=2, and Tn−1, and therefore K1=2/1=2, K2=2/1=2, and K=(2+2)/2=2. This corresponds to a case in which 2≦K<2.5, and therefore the missing tooth region C is detected.

If the crank signal is n-11 here, it is distributed in the missing tooth region E, if the crank signal is from n-10 to n-1, it is distributed in the missing tooth region A, and if the crank signal is n, it is distributed in the missing tooth region C. The distribution range of the missing tooth region (region identification value) therefore coincides with the first missing teeth number identification map (discrimination pattern), and the number of missing teeth is identified as "1".

One missing tooth detection is performed with a crank signal of 28, and therefore the angular position is detected as B75° CA and the cylinder group is detected as B.

Two missing teeth detection is not performed with the initial crank signal of 6, but with the next crank signal of 6, identification of the region of the number that satisfies the above-mentioned map is performed. If the crank signal is n-10, it is distributed in the missing tooth region C, and if the crank signal is from n-9 to n-1, it is distributed in the missing tooth region A. When the crank signal is n, it is distributed in the missing tooth region E. The distribution range of the missing tooth region (region identification value) therefore coincides with the second missing teeth number identification map (discrimination pattern), and the number of missing teeth is identified as "2".

Two missing teeth detection is performed with the next crank signal of 6, and therefore the angular position is detected as B75° CA and the cylinder group is detected as A.

In order to detect zero missing teeth, one missing tooth, and two missing teeth in Embodiment 3 above, threshold values are respectively set for classification, and detection of the number of missing teeth is performed. It is possible to set each of the classification threshold values for cases in which there is little variation in the crank signal period, but if there are large variations in the crank signal period, such as during startup, it is difficult to set the respective classification threshold values, and cases of erroneous detection of the number of missing teeth occur.

The number of missing teeth is not simply classified by threshold values in Embodiment 4, but rather, a plurality of missing teeth regions corresponding to each missing tooth are set, and the number of missing teeth is detected with respect to the distribution range of the missing tooth region (region identification value), and therefore breadth of each missing tooth threshold value becomes larger, and missing tooth detection can be performed with good accuracy even for cases in which variations in the crank signal period are large.

Figure 11:
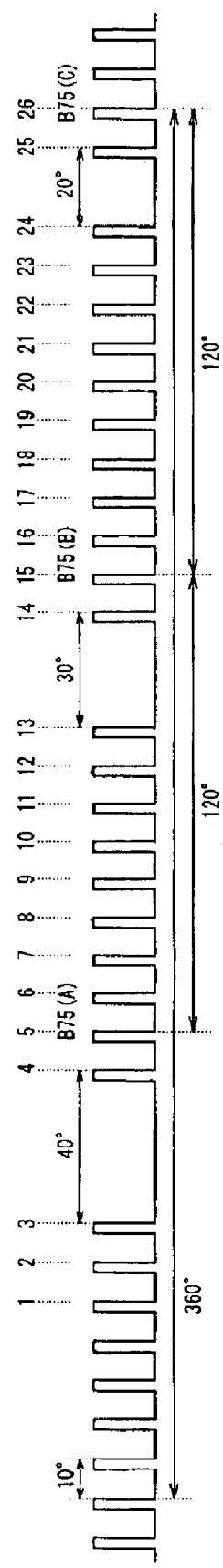
FIG. 11 is a diagram showing a crank signal pattern of a six-cylinder engine according to another example of Embodiment 4 of the present invention.

The angular gaps between missing teeth of the crank signal vane 16 include one location of 30° CA, and two locations of 20° CA in this example, but the angular gap between missing teeth may also be changed per missing tooth as shown in FIG. 11 as another example.

There are two locations of 20° CA in FIG. 9, and therefore the crank angle reference position B75° CA (B) can only be identified as one of the two locations, but by changing the angular gaps of all of the missing teeth as in FIG. 11, a specific crank angle reference position B75° CA can be detected.

As another example of Embodiment 4, the crank angle and the cylinder groups A, B, and C can be identified with respect to the crank signal. That is, in a six-cylinder engine, cylinder identification can be performed by providing two types of information (cylinder identification signals) to the cam signal vane, and therefore the cam signal vane information can be simplified.

Embodiment 5

A crank angle detecting device for an internal combustion engine according to Embodiment 5 of the present invention is explained while referring to the diagrams.

Figure 12:
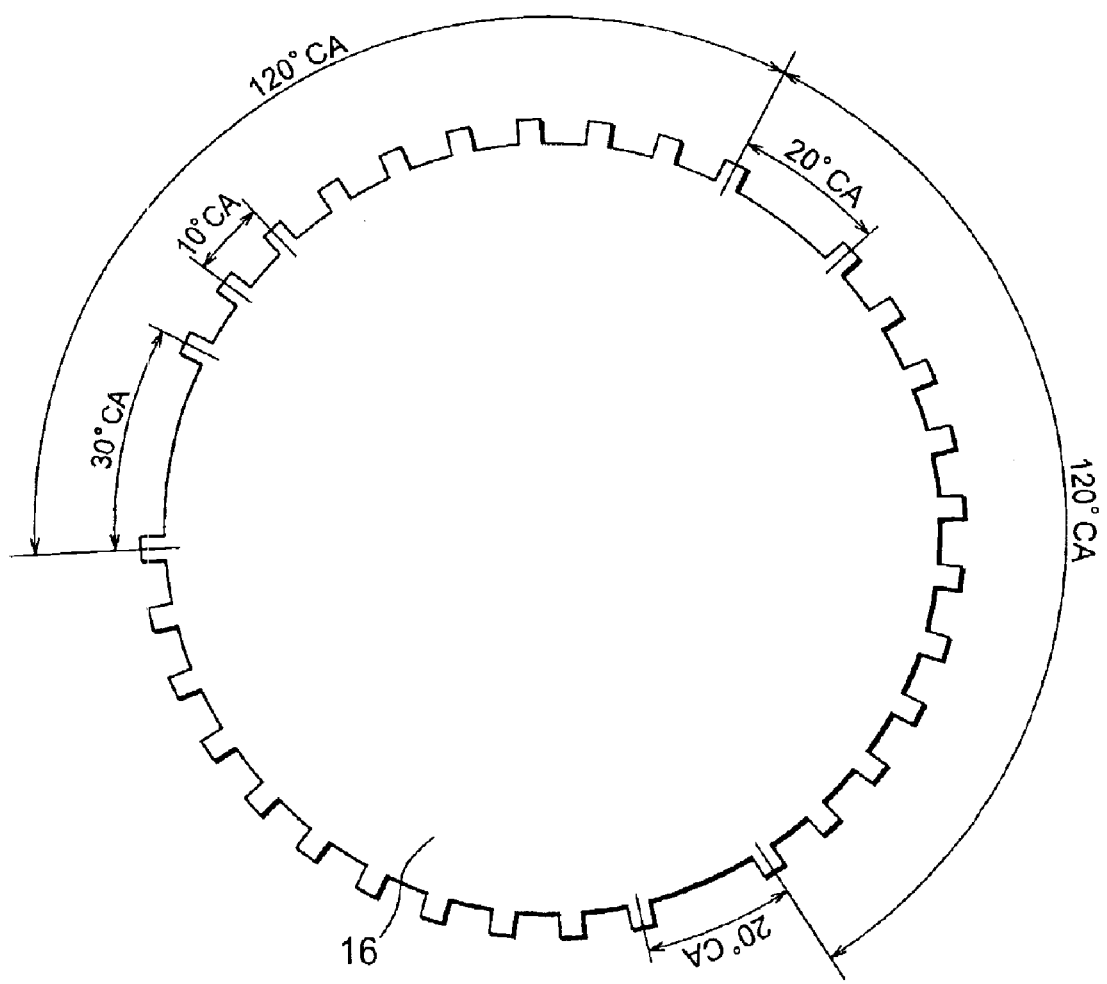
FIG. 12 is a diagram showing a crank signal vane of a three-cylinder engine according to Embodiment 5 of the present invention.

FIG. 12 is a diagram showing a crank signal vane of a three-cylinder engine according to Embodiment 5 of the present invention.

Teeth (protrusions) are formed in the crank signal vane 16 at every 10° CA in 360° of CA. Further, two 20° CA missing teeth portions (one missing tooth), and one 30° CA missing teeth portion (two missing teeth) are formed each 120° of CA.

Actions of the crank angle detecting device for the internal combustion engine according to Embodiment 5 are explained next while referring to the diagrams.

Figure 13:
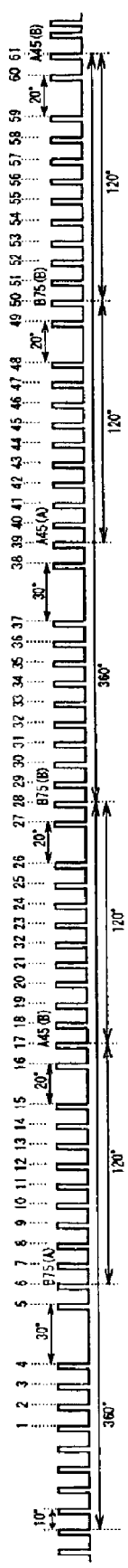
FIG. 13 is a diagram showing a crank signal pattern of the three-cylinder engine according to Embodiment 5 of the present invention.

FIG. 13 is a diagram showing a crank signal pattern of the three-cylinder engine according to Embodiment 5 of the present invention.

The crank signal pattern shown in FIG. 13 is detected by the crank angle sensor 15, and is input to the electronic control unit 18. The crank signal pattern is a signal output waveform of the crank angle sensor 15 with respect to the teeth of the crank signal vane 16 shown in FIG. 12.

The electronic control unit 18 is set so as to detect the trailing edge timing of the crank signal, and perform computation processing for each training edge.

The crank signal vane 16 rotates two times in the engine 1 cycle (720° CA). The angular gap between ignition strokes is 240° in a three-cylinder engine, and therefore the specific teeth of the crank signal vane 16 and the relative angular position of the engine differ between the first rotation and the second rotation of the crank signal vane 16 in the engine 1 cycle.

Also in Embodiment 5, there is performed computation of the missing tooth identification value K similarly to Embodiment 1 above, and detection of the number of missing teeth is performed with respect to the range of the missing tooth identification value K.

The electronic control unit 18 performs computation of the missing tooth identification value K described below for each crank signal detection similarly to Embodiment 1 above, and detection of the number of missing teeth is performed with respect to the range of the missing tooth identification value K.

$$K = (Tn-1)^2 / \{(Tn-2) * Tn\}$$

Tn expresses the current crank signal period, Tn−1 expresses the previous crank signal period, and Tn−2 expresses the crank signal period before the previous crank signal period.

If K<2.25, then no missing teeth are detected. Further, if 2.25≦K<6.25, then one missing tooth is detected. In addition, if K≧6.25, then two missing teeth are detected.

A method of missing teeth detection is explained according to FIG. 13. Note that the term crank signal period as used here simply denotes the ratio of angular gaps.

If the crank signal detected this time is equal to 1 to 4, then Tn−2=1, Tn−1=1, and Tn=1, and therefore K=1²÷(1×1)=1. This corresponds to a case in which K<2.25, and therefore no missing teeth are detected.

If the crank signal detected this time is equal to 5, then Tn−2=1, Tn−1=1, and Tn=3, and therefore K=1²÷(1×3)=0.33. This corresponds to a case in which K<2.25, and therefore no missing teeth are detected.

If the crank signal detected this time is equal to 6, then Tn−2=1, Tn−1=3, and Tn=1, and therefore K=3²÷(1×1)=9. This corresponds to a case in which K>6.25, and therefore two missing teeth are detected.

Two missing teeth detection is performed with a crank signal of 6, and therefore the angular position is detected as B75° CA (75° CA before top dead center) (cylinder group A), or A45° CA (45° CA after top dead center) (cylinder group A).

Similarly, if the crank signal detected this time is equal to 17, then Tn−2=1, Tn−1=2, and Tn=1, and therefore K=2²÷(1×1)=4. This corresponds to a case in which 2.25≦K<6.25, and therefore one missing tooth is detected.

One missing tooth detection is performed with a crank signal of 17, and therefore the angular position is detected as A45° CA (45° CA after top dead center) (cylinder group B), or B75° CA (75° CA before top dead center) (cylinder group B).

Similarly, if the crank signal detected this time is equal to 28, then Tn−2=1, Tn−1=2, and Tn=1, and therefore K=2²÷(1×1)=4. This corresponds to a case in which 2.25≦K<6.25, and therefore one missing tooth is detected.

One missing tooth detection is performed with a crank signal of 28, and therefore the angular position is detected as B75° CA (cylinder group B), or A45° CA (cylinder group B)

If the crank signal detected this time is equal to 39, then Tn−2=1, Tn−1=3, and Tn=1, and therefore K=3²÷(1×1)=9. This corresponds to a case in which K≧6.25, and therefore two missing teeth are detected.

Two missing teeth detection is performed with a crank signal of 39, and therefore the angular position is detected as A45° CA (cylinder group A), or B75° CA (cylinder group A).

Similarly, if the crank signal detected this time is equal to 50, then Tn−2=1, Tn−1=2, and Tn=1, and therefore K=2²÷(1×1)=4. This corresponds to a case in which 2.25≦K<6.25, and therefore one missing tooth is detected.

One missing tooth detection is performed with a crank signal of 50, and therefore the angular position is detected as B75° CA (cylinder group B), or A45° CA (cylinder group B).

Similarly, if the crank signal detected this time is equal to 61, then Tn−2=1, Tn−1=2, and Tn=1, and therefore K=2²÷(1×1)=4. This corresponds to a case in which 2.25≦K<6.25, and therefore one missing tooth is detected.

One missing tooth detection is performed with a crank signal of 61, and therefore the angular position is detected as A45° CA (cylinder group B), or B75° CA (cylinder group B).

The crank angle reference position B75° CA (cylinder group B) or A45° CA (cylinder group B) is detected when one missing tooth is detected. Further, the reference position B75° CA (cylinder group A) or A45° CA (cylinder group A) is detected when two missing teeth are detected.

That is, the reference position B75° CA (cylinder group A) exists in one position, the reference position B75° CA (cylinder group B) exists in two positions, the reference position A45° CA (cylinder group A) exists in one position, and the reference position A45° CA (cylinder group B) exists in two positions during the engine 1 cycle period (720° CA) in the engine 1 cycle (720° CA) with the three-cylinder engine crank signal pattern shown in FIG. 13. A distinction therefore cannot be made with the crank signal between the angular position of the reference position B75° CA and the reference position A45° CA, and therefore the cam signal is also used to perform angular position detection and cylinder identification. Cam signal information necessary when performing cylinder identification by B75° CA is information for distinguishing between B75° CA and A45° CA, and for distinguishing between the two positions of B75° CA (cylinder group B). For example, three types of B75° CA can be distinguished if the cam signal information is taken as follows:

B75° CA (A) . . . (a) pattern;

B75° CA (B) . . . (a) pattern and (b) pattern; and

A45° CA (A), A 45° CA (B) . . . (c) pattern.

Cylinder identification can thus be performed by providing three types of information (cylinder identification signals) to the cam signal, and therefore the cam signal vane information can be simplified.

Embodiment 6

A crank angle detecting device for an internal combustion engine according to Embodiment 6 of the present invention is explained while referring to the diagrams.

The map of FIG. 10 is used when performing identification of the number of missing teeth in the missing tooth region, as in Embodiment 2 and Embodiment 4 above.

The electronic control unit 18 performs computation of the identification expressions described below for each crank signal detection, and detection of the number of missing teeth is performed with respect to the range of the identification value.

$K1 = (Tn-1)/(Tn-2)$ $K2 = (Tn-1)/Tn$ $K = (K1+K2)/2$

Tn expresses the current crank signal period, Tn−1 expresses the previous crank signal period, and Tn−2 expresses the crank signal period before the previous crank signal period.

A method of missing teeth detection is explained according to FIG. 13. Note that the term crank signal period as used here simply denotes the ratio of angular gaps.

The correspondence between the missing tooth identification value K and missing tooth regions A, B, C, D, and E is as follows. The missing tooth region is A if K<1.5. Further, if $1.5 \leq K < 2$, then the missing tooth region is B. Further, if $2 \leq K < 2.5$, then the missing tooth region is C, and if $2.5 \leq K < 3$, then the missing tooth region is D. In addition, the missing tooth region is E if $K \geq 3$.

If the crank signal detected this time is equal to 1 to 4, then Tn−2=1, Tn−1=1, and Tn=1, and therefore K1=1/1=1, K2=1/1=1, and K=(1+1)/2=1. This corresponds to a case in which K<1.5, and therefore the missing tooth region A is detected.

If the crank signal detected this time is equal to 5, then Tn−2=1, Tn−1=1, and Tn=3, and therefore K1=1/1=1, K2=1/3=0.33, and K=(1+0.33)/2=0.67. This corresponds to a case in which K<1.5, and therefore the missing tooth region A is detected.

If the crank signal detected this time is equal to 6, then Tn−2=1, Tn−1=3, and Tn=1, and therefore K1=3/1=3, K2=3/1=3, and K=(3+3)/2=3. This corresponds to a case in which $K \geq 3$, and therefore the missing tooth region E is detected.

In Embodiment 5 above, detection of two missing teeth is made when the crank signal is in the position of 6, but in Embodiment 6, missing tooth detection is implemented using the missing teeth number identification map of FIG. 10 for cases in which the distribution region of the missing tooth region detected coincides with the missing teeth number identification map. If the missing tooth region identified this time is taken as n, then it is distributed at this point in the missing tooth region A when the crank signal is from n-7 to n-1, and is distributed in the missing tooth region E when the crank signal is equal to n. However, identification is not performed for regions having a number that satisfies the map, and therefore missing tooth detection is not implemented.

Similarly, if the crank signal detected this time is equal to 7, then Tn−2=3, Tn−1=1, and Tn=1, and therefore K1=1/3=0.33, K2=1/1=1, and K=(0.33+1)/2=0.67. This corresponds to a case in which K<1.5, and therefore the missing tooth region A is detected.

If the crank signal detected this time is equal to 8 to 15, then Tn−2=1, Tn−1=1, and Tn=1, and therefore K1=1/1=1, K2=1/1=1, and K=(1+1)/2=1. This corresponds to a case in which K<1.5, and therefore the missing tooth region A is detected.

If the crank signal detected this time is equal to 16, then Tn−2=1, Tn−1=1, and Tn=2, and therefore K1=1/1=1, K2=1/2=0.5, and K=(1+0.5)/2=0.75. This corresponds to a case in which K<1.5, and therefore the missing tooth region A is detected.

With crank signal positions from 10 to 16, the previously identified missing tooth region is equal to or greater than 10, and therefore identification of the region of the number satisfying the map is performed. However, since all the regions are the missing tooth region A, the distribution range of the missing tooth region coincides with the third missing teeth number identification map, and the number of missing teeth is identified as "none".

If the crank signal detected this time is equal to 17, then Tn−2=1, Tn−1=2, and Tn=1, and therefore K1=2/1=2, K2=2/1=2, and K=(2+2)/2=2. This corresponds to a case in which $2 \leq K < 2.5$, and therefore the missing tooth region C is detected.

In this case, if the crank signal is n-11, it is distributed in the missing tooth region E, if the crank signal is from n-10 to n-1, it is distributed in the missing tooth region A, and if the crank signal is n, it is distributed in the missing tooth region C. The distribution range of the missing tooth region therefore coincides with the first missing teeth number identification map, and the number of missing teeth is identified as "1".

One missing tooth detection is performed with a crank signal of 17, and therefore the angular position is identified as A45° CA (45° CA after top dead center) (cylinder group B), or B75° CA (75° CA before top dead center) (cylinder group B).

Similarly, if the crank signal detected this time is equal to 28, then Tn−2=1, Tn−1=2, and Tn=1, and therefore K1=2/1=2, K2=2/1=2, and K=(2+2)/2=2. This corresponds to a case in which $2 \leq K < 2.5$, and therefore the missing tooth region C is detected.

In this case, if the crank signal is n-11, it is distributed in the missing tooth region E, if the crank signal is from n-10 to n-1, it is distributed in the missing tooth region A, and if the crank signal is n, it is distributed in the missing tooth region C. The distribution range of the missing tooth region therefore coincides with the first missing teeth number identification map, and the number of missing teeth is identified as "1".

One missing tooth detection is performed with a crank signal of 28, and therefore the angular position is detected as B75° CA (cylinder group B), or A45° CA (cylinder group B)

Similarly, if the crank signal detected this time is equal to 39, then Tn−2=1, Tn−1=3, and Tn=1, and therefore K1=3/1=3, K2=3/1=3, and K=(3+3)/2=3. This corresponds to a case in which K>3, and therefore the missing tooth region E is detected.

In this case, if the crank signal is n-10, it is distributed in the missing tooth region C, if the crank signal is from n-9 to n-1, it is distributed in the missing tooth region A, and if the crank signal is n, it is distributed in the missing tooth region E. The distribution range of the missing tooth region therefore coincides with the second missing teeth number identification map, and the number of missing teeth is identified as "2".

Two missing teeth detection is performed with a crank signal of 39, and therefore the angular position is identified as A45° CA (cylinder group A), or B75° CA (cylinder group A)

Similarly, if the crank signal detected this time is equal to 50, then Tn−2=1, Tn−1=2, and Tn=1, and therefore K1=2/1=2, K2=2/1=2, and K=(2+2)/2=2. This corresponds to a case in which 2<K<2.5, and therefore the missing tooth region C is detected.

In this case, if the crank signal is n-11, it is distributed in the missing tooth region E, if the crank signal is from n-10 to n-1, it is distributed in the missing tooth region A, and if the crank signal is n, it is distributed in the missing tooth region C. The distribution range of the missing tooth region therefore coincides with the first missing teeth number identification map, and the number of missing teeth is identified as "1".

One missing tooth detection is performed with a crank signal of 50, and therefore the angular position is detected as B75° CA (cylinder group B), or A45° CA (cylinder group B)

Similarly, if the crank signal detected this time is equal to 61, then Tn−2=1, Tn−1=2, and Tn=1, and therefore K1=2/1=2, K2=2/1=2, and K=(2+2)/2=2. This corresponds to a case in which 2≦K<2.5, and therefore the missing tooth region C is detected.

In this case, if the crank signal is n-11, it is distributed in the missing tooth region E, if the crank signal is from n-10 to n-1, it is distributed in the missing tooth region A, and if the crank signal is n, it is distributed in the missing tooth region C. The distribution range of the missing tooth region therefore coincides with the first missing teeth number identification map, and the number of missing teeth is identified as "1".

One missing tooth detection is performed with a crank signal of 61, and therefore the angular position is detected as A45° CA (cylinder group B), or B75° CA (cylinder group B).

Two missing teeth detection is performed with the initial crank signal of 6, but with the next crank signal of 6, identification of the region of the number that satisfies the above-mentioned map is performed. If the crank signal is n-10, it is distributed in the missing tooth region C, and if the crank signal is from n-9 to n-1, it is distributed in the missing tooth region A. When the crank signal is n, it is distributed in the missing tooth region E. The distribution range of the missing tooth region therefore coincides with the second missing teeth number identification map, and the number of missing teeth is identified as "2".

Two missing teeth detection is performed with the next crank signal of 6, and therefore the angular position is identified as B75° CA (cylinder group A), or A45° CA (cylinder group A).

In order to detect zero missing teeth, one missing tooth, and two missing teeth in Embodiment 5 above, threshold values are respectively set for classification, and detection of the number of missing teeth is performed. It is possible to set each of the classification threshold values for cases in which there is little variation in the crank signal period, but if there are large variations in the crank signal period, such as during startup, it is difficult to set the respective classification threshold values, and cases of erroneous detection of the number of missing teeth occur.

The number of missing teeth is not simply classified by threshold values in Embodiment 6, but rather, a plurality of missing teeth regions corresponding to each missing tooth are set, and the number of missing teeth is detected with respect to the distribution range of the missing tooth region (pattern), and therefore breadth of each missing tooth threshold value becomes larger, and missing tooth detection can be performed with good accuracy even for cases in which variations in the crank signal period are large.

Figure 14:
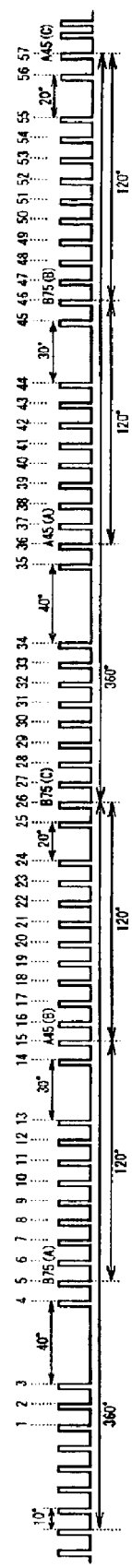
FIG. 14 is a diagram showing a crank signal pattern of a three-cylinder engine according to another example of Embodiment 6 of the present invention.

The angular gap between missing teeth may be changed per missing tooth as shown in FIG. 14 as another example.

The missing tooth identification value K is computed, and detection of the number of missing teeth is performed with respect to the range of the missing tooth identification value K as another example, similar to Embodiment 5 above.

The crank angle reference position B75 (C) or A45 (C) is detected when one missing tooth is detected. Further, the reference position B75 (B) or A45 (B) is detected when two missing teeth are detected. Furthermore, the reference position B75 (A) or A45 (A) is detected when three missing teeth are detected.

As another example of Embodiment 6, the crank angle and the cylinder groups A, B, and C can be identified with respect to the crank signal. That is, B75 and A45 may be distinguished for cases of performing cylinder identification at B75 with a three-cylinder engine. Cylinder identification can be performed by providing two types of information (cylinder identification signals) to the cam signal vane, and therefore the cam signal vane information can be simplified.

Embodiment 7

A crank angle detecting device for an internal combustion engine according to Embodiment 7 of the present invention is explained while referring to the diagrams.

Figure 15:
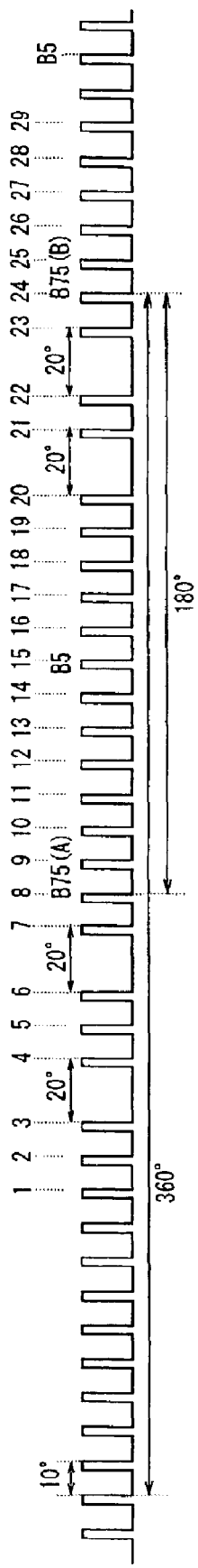
FIG. 15 is a diagram showing a crank signal pattern of a four-cylinder engine according to Embodiment 7 of the present invention.

FIG. 15 is a diagram showing a crank signal pattern of the four-cylinder engine according to Embodiment 7 of the present invention.

Missing teeth at angular gaps of 2020 CA are established at two locations in each ignition stroke interval (180° CA) with a crank signal vane corresponding to a crank signal pattern of a four-cylinder engine shown in FIG. 15. In addition, the angular gap between the first missing tooth (one missing tooth) (crank signals 3 to 4) and the second missing tooth (one missing tooth) (crank signals 6 to 7) is set to 20° CA in the first half ignition stroke interval (180° CA), and the angular gap between the first missing tooth (one missing tooth) (crank signals 20 to 21) and the second missing tooth (one missing tooth) (crank signals 22 to 23) is set to 10° CA in the second half ignition stroke interval (180° CA).

Similarly to Embodiment 1 above, the electronic control unit 18 performs computation of the missing tooth identification value K described below for each crank signal detection and detection of the number of missing teeth is performed with respect to the range of the missing tooth identification value K.

$$K=(Tn-1)^{\wedge}2/\{(Tn-2)*Tn\}$$

Tn expresses the current crank signal period, Tn−1 expresses the previous crank signal period, and Tn−2 expresses the crank signal period before the previous crank signal period.

If K<2.25, then no missing teeth are detected. Further, if K≧2.25, then one missing tooth is detected.

A method of missing teeth detection is explained according to FIG. 15. Note that the term crank signal period as used here simply denotes the ratio of angular gaps.

If the crank signal detected this time is equal to 1 to 3, then Tn−2=1, Tn−1=1, and Tn=1, and therefore K=$1^2$÷1× 1=1. This corresponds to a case in which K<2.25, and therefore no missing teeth are detected.

If the crank signal detected this time is equal to 4, then Tn−2=1, Tn−1=1, and Tn=2, and therefore K=$1^2$÷(1×2)=0.5. This corresponds to a case in which K<2.25, and therefore no missing teeth are detected.

If the crank signal detected this time is equal to 5, then Tn−2=1, Tn−1=2, and Tn=1, and therefore K=$2^2$÷1×1=4. This corresponds to a case in which K≧2.25, and therefore one missing tooth is detected.

If the crank signal detected this time is equal to 8, then Tn−2=1, Tn−1=2, and Tn=1, and therefore K=$2^2$÷1×1=4. This corresponds to a case in which K≧2.25, and therefore one missing tooth is detected.

Detection of one missing tooth is performed here with respect to a crank signal of 8 here, and the gap with the crank signal of 5 of the previously detected one missing tooth is 3 (=8−5), and therefore the crank angle reference position B75° CA (A) is detected.

Missing tooth detection is performed with respect to a crank signal of 22. The crank signal of the previously detected one missing tooth is 8, and the gap is not 3 or 2 (≠22−8), and therefore the position of the crank angle signal of 22 is not identified as B75' CA.

Next, missing tooth detection is performed with respect to a crank signal of 24. The crank signal of the previously detected one missing tooth is 22, and the gap is 2 (=24−22), and therefore the reference position of the crank angle is identified as B75° CA (B).

Figure 16:
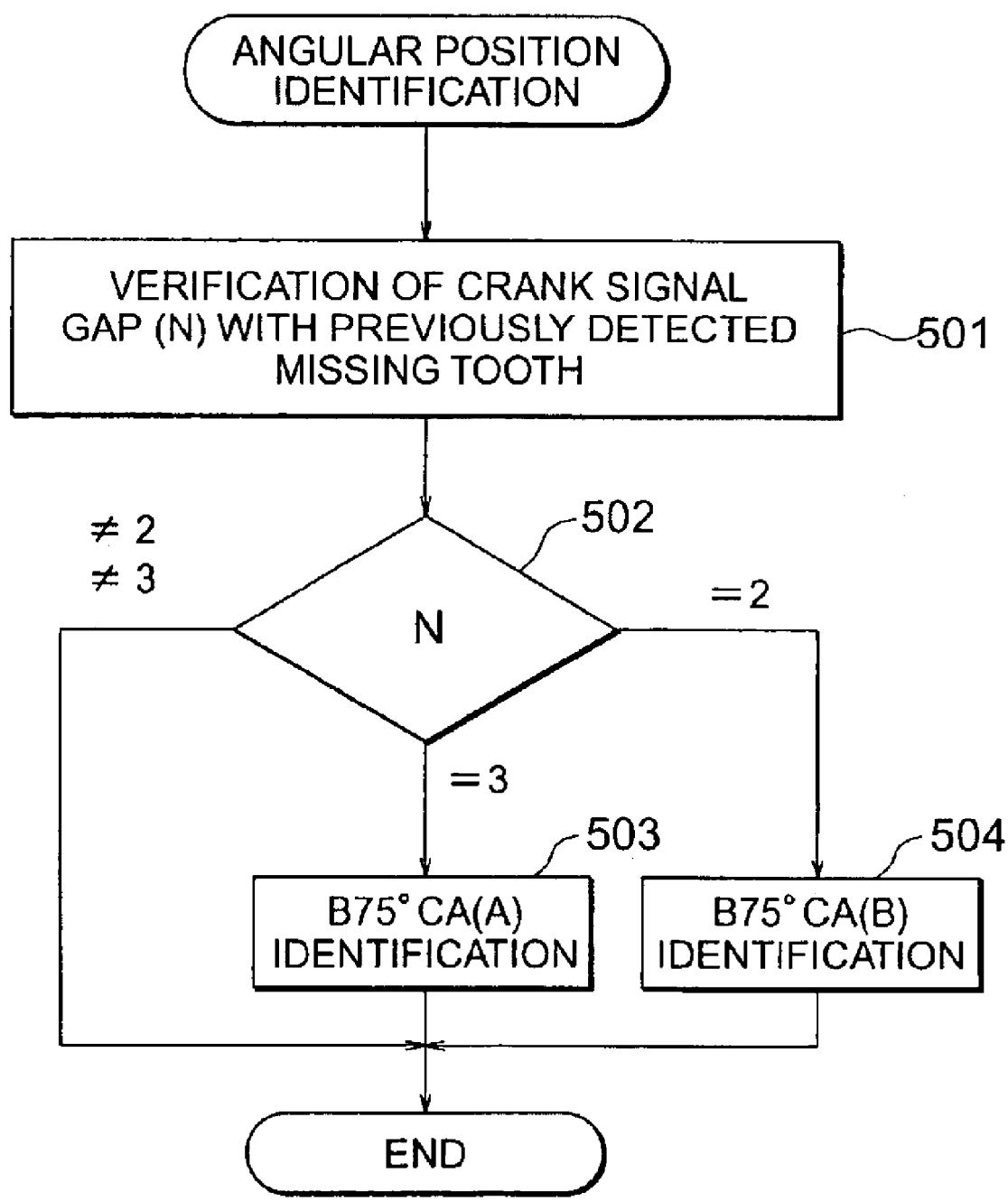
FIG. 16 is a flowchart showing action of a crank angle detecting device for an internal combustion engine according to Embodiment 7 of the present invention.

FIG. 16 is a flowchart showing action of the crank angle detecting device for the internal combustion engine according to Embodiment 7 of the present invention.

Actions up to performing missing tooth detection by using the missing tooth identification value K are similar to those of Embodiment 1 described above.

The electron control unit 18 finds the gap (N) (crank signal number) (N) between the previously detected missing tooth crank signal and the currently detected missing tooth crank signal in a step 501 when performing missing signal detection.

Identification of the signal number gap is performed next in a step 502. Processing moves to a step 503 if N=3, and to a step 504 if N=2. Crank angle reference position identification is not performed for cases in which N is neither 2 nor 3.

The currently detected crank angle position is identified as the crank angle reference position B75° CA (A) in the step 503.

The currently detected crank angle position is identified as the crank angle reference position B75° CA (B) in the step 504.

In Embodiment 7, the crank angle and the cylinder groups A and B can be identified with respect to the crank signal. That is, in a four-cylinder engine, cylinder identification can be performed by providing two types of information (cylinder identification signals) to the cam signal vane, and therefore the cam signal vane information can be simplified.

Embodiment 8

A crank angle detecting device for an internal combustion engine according to Embodiment 8 of the present invention is explained while referring to the diagrams.

Figure 17:
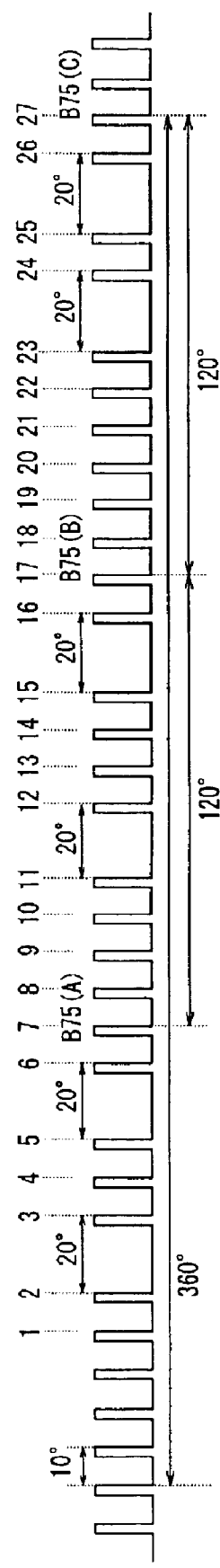
FIG. 17 is a diagram showing a crank signal pattern of a six-cylinder engine according to Embodiment 8 of the present invention.

FIG. 17 is a diagram showing a crank signal pattern of the six-cylinder engine according to Embodiment 8 of the present invention.

Missing teeth at angular gaps of 20° CA are established at two locations in each ignition stroke interval (120° CA) with a crank signal vane corresponding to a crank signal pattern of a six-cylinder engine shown in FIG. 17.

In addition, the angular gap between the first missing tooth (one missing tooth) (crank signals 2 to 3) and the second missing tooth (one missing tooth) (crank signals 5 to 6) is set to 20° CA in the first ignition stroke interval (120° CA), and the angular gap between the first missing tooth (one missing tooth) (crank signals 11 to 12) and the second missing tooth (one missing tooth) (crank signals 15 to 16) is set to 300 CA in the second ignition stroke interval (120° CA) The angular gap between the first missing tooth (one missing tooth) (crank signals 23 to 24) and the second missing tooth (one missing tooth) (crank signals 25 to 26) is set to 10° CA in the third ignition stroke interval (120° CA).

The electronic control unit 18 performs computation of the missing tooth identification value K described below for each crank signal detection similarly to Embodiment 7 above, and detection of the number of missing teeth (whether there are missing teeth or not) is performed with respect to the range of the missing tooth identification value K.

A method of missing teeth detection is explained according to FIG. 17. Note that the term crank signal period as used here simply denotes the ratio of angular gaps.

If the crank signal detected this time is equal to 4, then Tn−2=1, Tn−1=2, and Tn=1, and therefore K=$2^2$÷1×1=4. This corresponds to a case in which K≧2.25, and therefore one missing tooth is detected.

Next, if the crank signal detected this time is equal to 7, then Tn−2=1, Tn−1=2, and Tn=1, and therefore K=$2^2$÷1× 1=4. This corresponds to a case in which K≧2.25, and therefore one missing tooth is detected.

Detection of one missing tooth is performed here with respect to a crank signal of 7 here, and the gap with the crank signal of 4 of the previously detected one missing tooth is 3 (=7−4), and therefore the crank angle reference position B75° CA (A) is detected.

If the crank signal detected this time is equal to 13, then Tn−2=1, Tn−1=2, and Tn=1, and therefore K=$2^2$÷1×1=4. This corresponds to a case in which K≧2.25, and therefore one missing tooth is detected. However, the gap with the crank signal of 7 of the previously detected one missing tooth is 6 (=13−7), and therefore detection of the crank angle position is not performed.

Next, if the crank signal detected this time is equal to 17, then Tn−2=1, Tn−1=2, and Tn=1, and therefore K=$2^2$÷1× 1=4. This corresponds to a case in which K≧2.25, and therefore one missing tooth is detected.

Detection of one missing tooth is performed here with respect to a crank signal of 17 here, and the gap with the crank signal of 13 of the previously detected one missing tooth is 4 (=17−13), and therefore the crank angle reference position B75° CA (B) is detected.

If the crank signal detected this time is equal to 25, then Tn−2=1, Tn−1=2, and Tn=1, and therefore K=2²÷1×1=4. This corresponds to a case in which K≧2.25, and therefore one missing tooth is detected. However, the gap with the crank signal of 17 of the previously detected one missing tooth is 8 (=25−17), and therefore detection of the crank angle position is not performed.

Next, if the crank signal detected this time is equal to 27, then Tn−2=1, Tn−1=2, and Tn=1, and therefore K=2²÷1×1=4. This corresponds to a case in which K≧2.25, and therefore one missing tooth is detected.

Detection of one missing tooth is performed here with respect to a crank signal of 27 here, and the gap with the crank signal of 25 of the previously detected one missing tooth is 2 (=27−25), and therefore the crank angle reference position B75° CA (C) is detected.

In Embodiment 8, the crank angle and the cylinder groups A, B, and C can be identified with respect to the crank signal. That is, in a six-cylinder engine, cylinder identification can be performed by providing two types of information (cylinder identification signals) to the cam signal vane, and therefore the cam signal vane information can be simplified.

Next, another example of Embodiment 8 is described.

Figure 18:
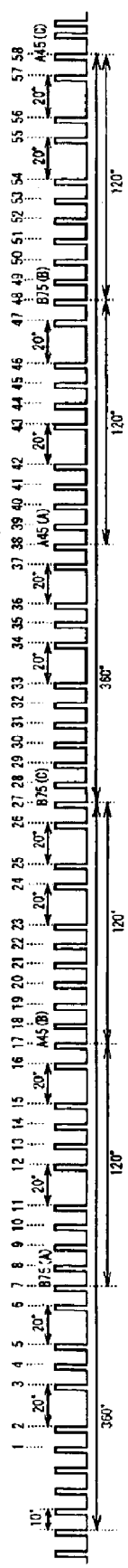
FIG. 18 is a diagram showing a crank signal pattern of a three-cylinder engine according to another example of Embodiment 8 of the present invention.

FIG. 18 is a diagram showing a crank signal pattern of the three-cylinder engine according to another example of Embodiment 8 of the present invention.

Missing teeth having an angular gap of 20° CA are established at two locations in each half angular region (120° CA) of the ignition stroke interval (240° CA) with the crank signal vane corresponding to the three-cylinder engine crank signal pattern shown in FIG. 18.

FIG. 18 is a diagram showing the relationship between the crank signal pattern of the three-cylinder engine 1 cycle (720° CA) and the angular positions.

The electronic control unit 18 performs current missing tooth detection, and the angular position identification is performed with respect to the crank signal gap (N) with the previously detected missing tooth. That is, if the gap N=3, the crank angle reference position B75° CA (A) or A45° CA (A) is identified. Further, the crank angle reference position B75° CA (B) or A45° CA (B) is identified if the gap N=4. In addition, the crank angle reference position B75° CA (C) or A45° CA (C) is identified if the gap N=2.

In another example of Embodiment 8, the crank angle and the cylinder groups A, B, and C can be identified with respect to the crank signal. That is, when cylinder identification is performed at B75 in a three-cylinder engine, B75 (A), B75 (B), and A45 may be distinguished. Cylinder identification can be performed by providing two types of information (cylinder identification signals) to the cam signal vane, and therefore the cam signal vane information can be simplified.

A cylinder group identifying means (missing teeth) is thus set in the crank signal vane 16 in accordance with each of the embodiments described above, and therefore the information that needs to be set into the cam signal vane in order to perform cylinder identification can be simplified.

Plural ignition strokes are needed for specific cylinder identification for cases in which there is no cylinder group identifying means in the crank signal vane, the cam signal vane diameter is small, and a complex cylinder identification signal cannot be set. However, the cam signal pattern (cylinder identification signal) is simplified, and therefore information (cylinder identification signal) can also be set in the small diameter cam signal vane, and cylinder identification can be performed in one ignition stroke.

Further, although the cam signal vane is conventionally formed by precision processing, the degree of difficulty in processing can be reduced by simplifying the cam signal pattern, and therefore costs can be reduced.

In addition, although it is necessary to use a highly accurate sensor in order to detect a complex cam signal pattern conventionally, the sensor accuracy can be lowered, and costs can be reduced.

What is claimed is:

1. A crank angle detecting device for an internal combustion engine, comprising:
   a crank signal vane that rotates in synchronous with a crank shaft of the internal combustion engine, and is provided with teeth on a circumference at predetermined crank angles, and with a first missing tooth portion having a first predetermined number of missing teeth and a second missing tooth portion having a second predetermined number of missing teeth;
   a crank angle sensor that outputs a pulse shape crank signal pattern corresponding to the teeth and attached in proximity to the crank signal vane; and
   an electronic control unit that calculates a crank signal period based on the crank signal pattern, computes a missing teeth determination value based on the calculated crank signal period, detects the number of missing teeth based on the computed missing teeth determination value, and detects a crank angle reference position based on the detected number of missing teeth.

2. A crank angle detecting device for an internal combustion engine, comprising:
   a crank signal vane that rotates in synchronous with a crank shaft of the internal combustion engine, and is provided with teeth on a circumference at predetermined crank angles, and with a first missing tooth portion having a first predetermined number of missing teeth and a second missing tooth portion having a second predetermined number of missing teeth, are provided;
   a crank angle sensor that outputs a pulse shape crank signal pattern corresponding to the teeth and attached in proximity to the crank signal vane; and
   an electronic control unit having: a determination value computing means for calculating a crank signal period based on the crank signal pattern and computes a missing teeth determination value based on the calculated crank signal period; a region determining means for determining which of the missing tooth regions that are set in advance corresponds to the missing teeth determination value; and a missing teeth number identifying means for comparing a plurality of region determination values that are obtained in a time sequence from the region determining means with a predetermined discrimination pattern, and which detects a crank angle reference position based on the determined number of missing teeth.

3. A crank angle detecting device for an internal combustion engine according to claim 2, wherein:
   the identifying pattern has three types of region reference values that are adjacent in a time sequence; and
   the values of two types of the region reference values that are adjacent to any one of the three types of the region reference values are partially duplicated.

4. A crank angle detecting device for an internal combustion engine according to claim 2, wherein:

the identifying pattern is also taken as an element for identifying the number of teeth existing between a missing tooth portion and another missing tooth portion.

5. A crank angle detecting device for an internal combustion engine according to claim 2, wherein:

the missing tooth region is established based upon the value of (previous crank signal period)/(crank signal period before the previous crank signal period), and the value of (the previous crank signal period)/(current crank signal period).

6. A crank angle detecting device for an internal combustion engine according to claim 2, wherein:

the electronic control unit detects the crank angle reference position based on the number of missing teeth identified, and determines a cylinder group.

7. A crank angle detecting device for an internal combustion engine according to claim 3, wherein:

the identifying pattern is also taken as an element for identifying the number of teeth existing between a missing tooth portion and another missing tooth portion.

8. A crank angle detecting device for an internal combustion engine according to claim 3, wherein:

the missing tooth region is established based upon the value of (previous crank signal period)/(crank signal period before the previous crank signal period), and the value of (the previous crank signal period)/(current crank signal period).

9. A crank angle detecting device for an internal combustion engine according to claim 4, wherein:

the missing tooth region is established based upon the value of (previous crank signal period)/(crank signal period before the previous crank signal period), and the value of (the previous crank signal period)/(current crank signal period).

10. A crank angle detecting device for an internal combustion engine, comprising:

a crank signal vane that rotates in synchronous with a crank shaft of the internal combustion engine, and is provided with teeth on a circumference at predetermined crank angles, in which a plurality of missing tooth portions are formed, and at least the number of teeth existing between a reference missing tooth portion and at least one adjacent missing tooth portion differs from the number of teeth existing between other missing tooth portions;

a crank angle sensor that outputs a pulse shape crank signal pattern corresponding to the teeth and attached in proximity to the crank signal vane; and an electronic control unit that finds the number of teeth between the missing tooth portions based on the crank signal pattern, and detects a reference position of the crank angle.

11. A crank angle detecting device for an internal combustion engine, comprising:

a crank signal vane that rotates in synchronous with a crank shaft of the internal combustion engine, and is provided with teeth on a circumference at predetermined crank angles, and with a first missing tooth portion having a first predetermined number of missing teeth and a second missing tooth portion having a second predetermined number of missing teeth;

a crank angle sensor that outputs a pulse shape crank signal pattern corresponding to the teeth and attached in proximity to the crank signal vane; and an electronic control unit that calculates a crank signal period based on the crank signal pattern, computes a missing teeth determination value based on the calculated crank signal period, detects the number of missing teeth based on the computed missing teeth determination value, and detects a crank angle reference position based on the detected number of missing teeth, wherein:

the electronic control unit detects the crank angle reference position based on the number of missing teeth detected, and determines a cylinder group.

* * * * *